M. B. PALICH.
SACK HOLDING DEVICE.
APPLICATION FILED AUG. 22, 1921.
1,401,723.
Patented Dec. 27, 1921.
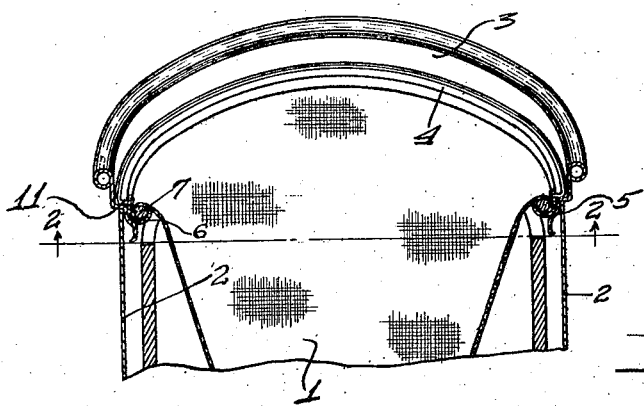
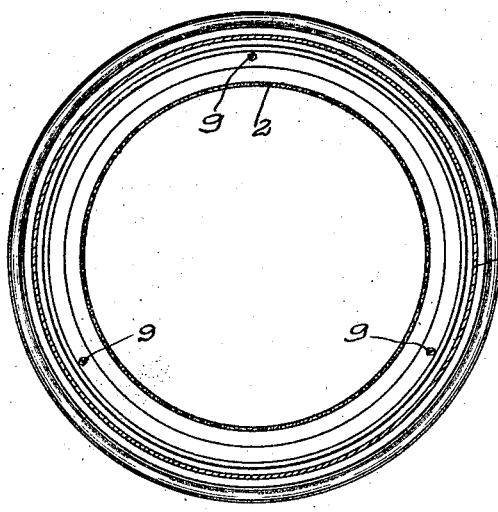
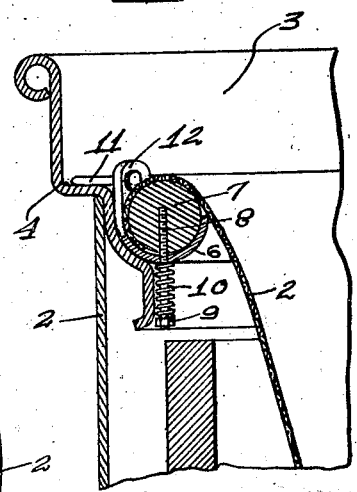
Inventor
Martin B. Palich

UNITED STATES PATENT OFFICE.

MARTIN B. PALICH, OF CHICAGO, ILLINOIS.

SACK-HOLDING DEVICE.

1,401,723. Specification of Letters Patent. Patented Dec. 27, 1921.

Application filed August 22, 1921. Serial No. 494,084.

*To all whom it may concern:*

Be it known that I, MARTIN B. PALICH, a citizen of Austria, who has declared his intention of becoming a citizen of the United States, and a resident of the city of Chicago, in the county of Cook and State of Illinois, have invented certain new and useful Improvements in a Sack-Holding Device; and I do hereby declare that the following is a full, clear, and exact description of the same, reference being had to the accompanying drawings, and to the numerals of reference marked thereon, which form a part of this specification.

This invention relates to a sack holding device and particularly to a device which is designed to hold coffee containing sacks in position in coffee urns. In coffee urns as used in restaurants, hotels and other places where coffee is used in quantities, it is customary to place the ground coffee berries in a sack or cloth which is suspended in the urn, and when it is desired to replenish the ground coffee the sack is removed and a clean sack with fresh coffee therein is substituted therefor. These sacks have heretofore generally been held in position by a wire ring threaded through the top thereof and considerable loss of time and inconvenience has been occasioned by the necessity for removing and changing these wire rings each time the sacks were changed and washed.

It is an object of the present invention to provide an improved means for securing a sack suspended in a container.

It is another object of this invention to provide a supporting ring which is adapted to releasably engage a sack and to hold the same suspended in a container.

It is an important object of this invention to provide a device for supporting a sack in suspended position in a container, said device being adapted to releasably engage the sack and to be removed with the sack from the container.

Other and further important objects of this invention will be apparent from the disclosures in the specification and the drawings.

The invention (in a preferred form) is shown on the drawings and hereinafter more fully described.

On the drawings:

Figure 1 is a fragmentary vertical section through a coffee urn which is equipped with the improved sack holding device of this invention.

Fig. 2 is a section on the line 2—2 of Fig. 1.

Fig. 3 is a fragmentary vertical section showing the construction of the spring which holds the rings together.

As shown on the drawings:

The device of this invention is adapted to support a cloth or sack 1 in suspended position in a container 2, which, for purposes of illustration, is shown herein as an ordinary coffee urn. Said urn 2 ordinarily has secured in the upper end thereof a flange portion 3 which is formed outwardly to afford a step or shoulder 4 and which extends downwardly into the urn affording a second step or shoulder 5 of curved section. Resting on said shoulder 5 is an annular channel ring 6 which is of arcuate section, as shown in Fig. 3, and which has resiliently secured thereto and resting therein a second ring 7, said ring 7 being secured to the ring 6 by means of a plurality of screws 8 engaged in threaded apertures therein and loosely engaged through apertures in the ring 6. Engaged around said machine screws 8 on the outside of the ring 6 between said ring and head 9 on the head of the machine screws are helical springs 10 which act to force said machine screws outwardly through the apertures in the ring 6 and to consequently hold the ring 7 resiliently against the inside of the ring 6. In order that the rings 6 and 7 and the sack 2 which is secured therebetween may be conveniently lifted out of the urn 2, a suitable bail 11 is provided which is adapted to rest on the upper side of the shoulder 4 and which is pivotally engaged in ears 12 which are integral with the ring 6 and which extend upwardly from the outer side thereof.

The operation of the device of this invention will be obvious from the foregoing description. The rings 6 and 7 may be removed from the container by simply lifting up the bail 11 and lifting the rings, together with the sack 2, out of the container, after which the sack 2 may be removed from between the rings by simply pulling the same apart against the action of the helical springs 10 and after this a new or clean sack 2 may be substituted by again pulling apart the rings 6 and 7 and engaging the upper edge of the sack between the same where it will be frictionally held by the action of said helical springs 10. The tension on these springs 10 may of course be properly adjusted by rotation of the head 9, and consequently the frictional effect of the rings on the edge of the sack made great enough to always hold the edge of the sack as tightly as desired.

It will thus be apparent that this invention provides a convenient device for supporting a sack in suspended position in a container and that the sack and device may be conveniently removed from the container by means of the bail 11 and that the old sack may be removed for emptying and cleaning and a new sack secured therein in a very short time. The liability of that person changing the sack being burned or otherwise injured is greatly lessened and the time consumed in removing the old sacks and replacing them with new or clean sacks is greatly shortened.

I am aware that many details of construction may be varied through a wide range without departing from the principles of this invention, and I therefore do not purpose limiting the patent granted otherwise than necessitated by the prior art.

I claim as my invention:

1. The combination with a container having supporting means therein, of interfitting annuli resiliently held together and resting on said supporting means, a sack frictionally engaged between the annuli, and a bail normally resting inside the container and connected to the annuli for removing the sack and the annuli from the container.

2. The combination with a container having supporting means therein, of interfitting annuli resiliently held together and resting on said supporting means, a sack frictionally engaged between the annuli, and means for varying the amount of pressure exerted on the sack by the annuli.

3. A sack holding device of the class described comprising an annulus of arcuate channeled section, a second annulus interfitting therewith, a plurality of screws engaged in said second annulus and extending outwardly through apertures in the first annulus, a helical spring engaged around each screw on the outside of the first annulus, and a notch on each screw for compressing the springs thereon and thereby resiliently holding the annulus together.

4. A sack holding device of the class described comprising an annulus of arcuate section, a second annulus interfitting therewith, a plurality of connecting means secured in the second annulus and extending outwardly through apertures in the first annulus, a helical spring engaged around each of said connecting means on the outside of the first annulus, means on each of said connecting means for compressing the spring thereon and thereby resiliently holding the annuli together, and a bail secured to the first mentioned annulus.

5. A container, inwardly projecting supporting means in said container, a pair of rim members resting on said supporting means, and means for resiliently holding said rim members against separation, whereby they are adapted to clampingly engage a sack and support it within the container.

6. In a support for a bag, a frame composed of two members each adapted to surround the mouth of the bag, clamping means for forcing said members toward one another, a container, and a support within said container on which said frame rests.

7. In a bag support, a rim composed of two members, and means for forcing them toward one another in a direction parallel to the depth of the bag.

8. In a container, a bag supporting device including a bag clamping attachment, and a flange extending thereunder to support the same, a bail pivoted to said attachment and adapted when turned into the plane of said attachment to rest upon said flange.

In testimony whereof I have hereunto subscribed my name in the presence of two subscribing witnesses.

MARTIN B. PALICH.

Witnesses:
CARLTON HILL,
JAMES M. O'BRIEN.